(12) United States Patent
Katsurahira et al.

(10) Patent No.: US 6,278,440 B1
(45) Date of Patent: Aug. 21, 2001

(54) COORDINATE INPUT APPARATUS AND POSITION-POINTING DEVICE

(75) Inventors: Yuji Katsurahira; Hiromichi Kanzaki, both of Saitama-Ken (JP)

(73) Assignee: Wacom Co., Ltd., Saitama-ken (JP)

( * ) Notice: Subject to any disclaimer, the term of this patent is extended or adjusted under 35 U.S.C. 154(b) by 0 days.

(21) Appl. No.: 09/098,468

(22) Filed: Jun. 17, 1998

(51) Int. Cl.[7] ...................................... G09G 5/08
(52) U.S. Cl. ...................... 345/163; 345/173; 178/18.07
(58) Field of Search .................... 345/173, 163, 345/161, 169, 171; 178/18.07, 19.04, 19.07, 18, 19; 341/5; 701/37

(56) References Cited

U.S. PATENT DOCUMENTS

| | | |
|---|---|---|
| 4,878,553 | 11/1989 | Yamanami et al. . |
| 5,239,489 * | 8/1993 | Russell ................................... 701/37 |
| 5,369,227 * | 11/1994 | Stone ................................ 178/19.07 |
| 5,466,896 | 11/1995 | Murakami et al. . |
| 5,483,262 * | 1/1996 | Izutani ................................. 345/179 |
| 5,563,631 * | 10/1996 | Masunaga ............................ 345/169 |
| 5,571,997 * | 11/1996 | Gray et al. ......................... 178/19.04 |
| 5,646,377 * | 7/1997 | Oda ................................... 178/18.07 |
| 5,706,000 * | 1/1998 | Fukuzaki et al. ......................... 341/5 |
| 5,706,028 * | 1/1998 | Murakami et al. ................... 345/157 |
| 5,750,939 * | 5/1998 | Makinwa et al. ...................... 178/18 |
| 5,793,356 * | 8/1998 | Svancarek et al. .................. 345/161 |
| 5,805,143 * | 9/1998 | Myers .................................. 345/163 |
| 6,043,807 * | 1/2000 | Carroll ................................. 345/163 |

* cited by examiner

*Primary Examiner*—Steven Saras
*Assistant Examiner*—Uchendu O. Anyaso
(74) *Attorney, Agent, or Firm*—Finnegan, Henderson, Farabow, Garrett & Dunner, L.L.P.

(57) ABSTRACT

A coordinate input apparatus includes a position-detecting unit and position-pointing devices. The position-pointing devices include a pen-type position-pointing device and a puck-type position-pointing device provided with a magnetic shielding member or short-circuiting coil for hindering the electromagnetic interaction between sensor coils included in the position-detecting unit and the pen-type position-pointing device. By providing in the puck-type position-pointing device a means for suppressing or cutting the voltage or current of a coil or resonant circuit included in the puck-type position-pointing device, the loading of the pen-type position-pointing device into a pen-type device supporting means provided on the puck-type position-pointing device can deactivate the means for suppressing or cutting the voltage or current of the coil or resonant circuit.

15 Claims, 4 Drawing Sheets

COORDINATE INPUT APPARATUS AND POSITION-POINTING DEVICE

BACKGROUND OF THE INVENTION

1. Field of the Invention

The present invention relates to a puck-type position-pointing device and a pen-type position-pointing device which are used on a position-detecting unit in a coordinate input apparatus.

2. Description of the Related Art

In a conventional coordinate input apparatus, a puck-type position-pointing device and a pen-type position-pointing device may operate independently of each other, and may be simultaneously used on the same position-detecting unit.

The coordinate input apparatus includes a position-detecting unit and a position-pointing device a such as a puck-type position-pointing device or a pen-type position-pointing device. Two-dimensional positional information and switching information are input by moving the puck-type position-pointing device or the pen-type position-pointing device in contact with the input detecting surface of the position-detecting unit, or by using switches provided on the puck-type position-pointing device or the pen-type position-pointing device. Writing-pressure information is input with the pen-type position-pointing device.

The puck-type position-pointing device and the pen-type position-pointing device have different purposes in many cases. Accordingly, for example, when the puck-type position-pointing device and the pen-type position-pointing device are used while being frequently exchanged, it is troublesome to position the pen-type position-pointing device away from the position-detecting surface of the position-detecting unit before exchanging it for the puck-type position-pointing device. In addition, when the pen-type position-pointing device is positioned on the position-detecting surface of the position-detecting unit, a problem arises concerning the prevention of erroneous input.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

Accordingly, it is an object of the present invention to provide: first and second position-pointing devices in which the exchanging operation is simplified. Switching between devices is incorporated within the exchange operation to prevent erroneous input by the one not used.

According to one aspect of the present invention, a coordinate input apparatus includes: a position-detecting unit having a sensor surface formed by arranging in parallel a plurality of sensor coils along the position-detecting direction, and switching means connected to the plurality of sensor coils so as to select one coil or simultaneously select more than one coil from the plurality of coils; and position-pointing devices having a built-in coil or resonant circuit and including a pen-type position-pointing device and a puck-type position-pointing device provided with a supporting means for supporting the pen-type position-pointing device, the supporting means being provided with a magnetic shielding member for hindering an electromagnetic interaction between the pen-type position-pointing device and the sensor coils, whereby the position detecting unit uses the electromagnetic interaction between the plurality of sensor coils and the position-pointing devices to detect the coordinates of the position-pointing devices.

According to another aspect of the present invention, a coordinate input apparatus includes: a position-detecting unit having a sensor surface formed by arranging in parallel a plurality of sensor coils along the position-detecting direction, and switching means connected to the plurality of sensor coils so as to select one coil or simultaneously select more than one coil from the plurality of sensor coils; and position-pointing devices having at least a built-in coil or resonant circuit and including a pen-type position-pointing device and a puck-type position-pointing device including supporting means for supporting the pen-type position-pointing device, and a short-circuiting coil being provided between the supporting means and the sensor coils so as to hinder an electromagnetic interaction between the pen-type position-pointing device and the sensor coils, whereby the position-detecting unit uses the electromagnetic interaction between the plurality of sensor coils and the position-pointing devices to detect the coordinates of the position-pointing devices.

Preferably, in the position-pointing devices, a means for suppressing the voltage of a resonant circuit or a coil generating electromagnetic interaction is provided for a coil or resonant circuit included in the puck-type position-pointing device so that the suppressing means is deactivated to activate the position-detecting function of the puck-type position-pointing device by loading the pen-type position-pointing device into the supporting means.

In the position-pointing devices, a means for cutting the current of a resonant circuit or coil generating electromagnetic interaction may be provided for a resonant circuit or coil included in the puck-type position-pointing device so that the cutting means is deactivated to activate the position-designating function of the puck-type position-pointing device by loading the pen-type position-pointing device into the supporting means.

According to a further aspect of the present invention, position-pointing devices include: a pen-type position-pointing device; and a puck-type position-pointing device having a supporting member for supporting a pen-type position-pointing device, and a magnetic shielding member provided on the supporting member so as to hinder an electromagnetic interaction between a coordinate input apparatus and the pen-type position-pointing device.

According to a still further aspect of the present invention, position-pointing devices include: a pen-type position-pointing device; and a puck-type position-pointing device having a supporting member for supporting a pen-type position-pointing device, and a short-circuiting coil provided between the supporting member and a coordinate input apparatus so as to hinder an electromagnetic interaction between the coordinate input apparatus and the pen-type position-pointing device.

Preferably, a means for suppressing the voltage of a resonant circuit or coil generating electromagnetic interaction is provided for a coil or resonant circuit included in the puck-type position-pointing device so that the suppressing means is deactivated to activate the position-pointing function of the puck-type position-pointing device by loading the pen-type position-pointing device into the supporting means.

A means for cutting the current of a resonant circuit or coil generating electromagnetic interaction may be provided for a resonant circuit or coil included in the puck-type position-pointing device so that the cutting means is deactivated to activate the position-designating function of the puck-type position-pointing device by loading the pen-type position-pointing device into the supporting means.

According to the present invention, it is possible to eliminate the conventional trouble of exchanging a pen-type position-pointing device and a puck-type position-pointing device, which occurs when both devices are used on an identical position-detecting unit. In addition, by deactivating the function of the pen-type or puck-type position-pointing device not used, erroneous input by either can be prevented.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

According to the present invention, a first position pointing device and a second position pointing device are both used with an input device. The first position pointing device may receive the second position pointing device, and magnetic shielding in the first position pointing device shields the second device from the input unit.

Figure 1A:
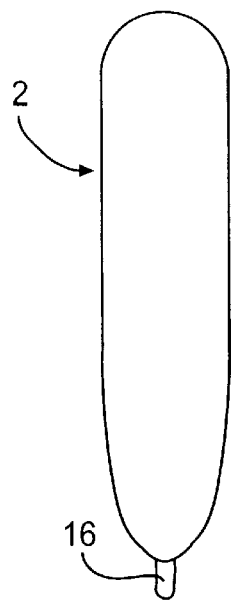
FIG. 1A is a side view showing a pen-type position-pointing device.
Figure 1B:
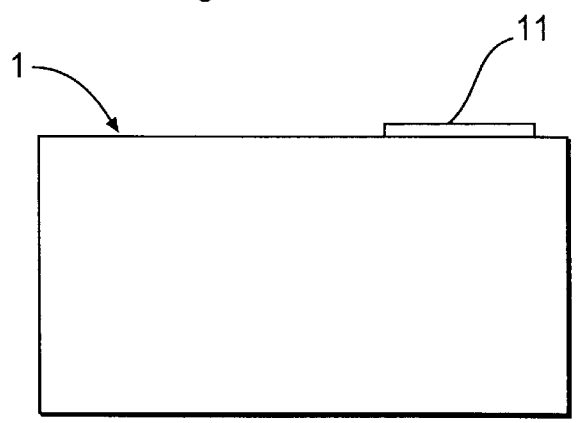
FIG. 1B is a side view showing a puck-type position-pointing device.
Figure 1C:
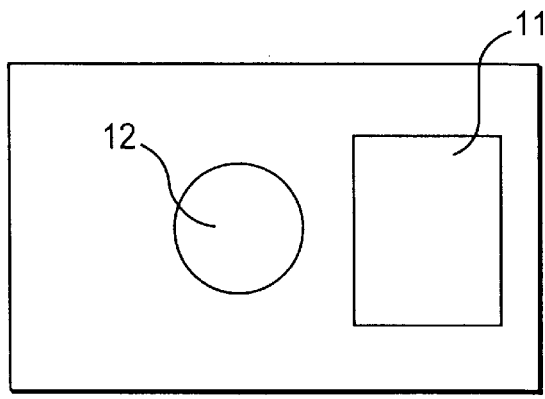
FIG. 1C is a plan view showing the puck-type position-pointing device shown in FIG. 1B.
Figure 2A:
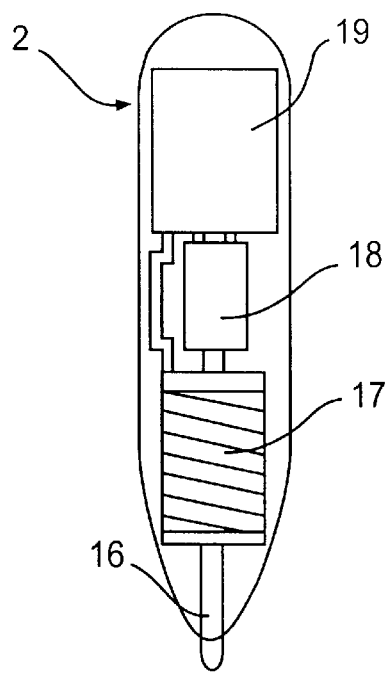
FIG. 2A is an internal side view showing a pen-type position-pointing device according to a first embodiment of the present invention.
Figure 2B:
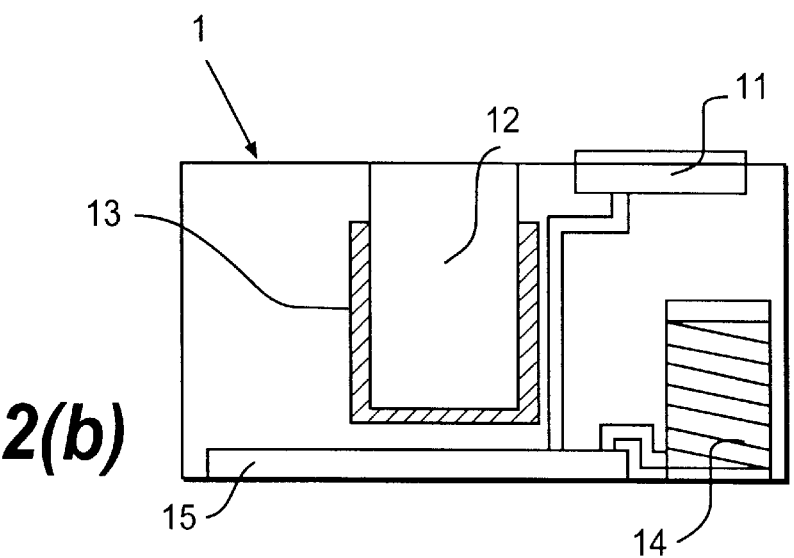
FIG. 2B is an internal side view showing a puck-type position-pointing device according to the first embodiment of the present invention.

The present invention is embodied in position pointing or coordinate input devices used with an associated graphics tablet. A coordinate input device inputs information such as graphics or a drawing by tracing on the graphics tablet. Examples of coordinate input devices and graphics tablets are disclosed in U.S. Pat. Nos. 4,878,553 and 5,466,896, the disclosures of which are hereby incorporated by reference. According to an embodiment of the invention, a position-detecting unit, such as a graphics tablet, may include a sensor surface formed by arranging, in parallel, a plurality of sensor coils along the position-detecting direction. A switching means, connected to the plurality of sensor coils, then selects one coil or simultaneously selects more than one coil from the plurality of coils A first embodiment of the present invention will be described below. The first embodiment of the present invention is shown in FIGS. 1A, 1B, 1C, 2A, and 2B. FIG. 1A is a side view of a pen-type position-pointing device 2. FIG. 1B is a side view of a puck-type position-pointing device 1 having a switch 11 mounted so as to be operable when the puck-type position-pointing device 1 is held. FIG. 1C is a plan view showing the puck-type position-pointing device 1 shown in FIG. 1B. FIG. 2A is a cut-away side view of the pen-type position-pointing device 2. FIG. 2B is a cut-away side view of the puck-type position-pointing device 1.

The position device 1 has a pen-type device stand 12 for receiving the position pointing device 2. According to this embodiment, the stand 12 has a well-like shape. However, supports having different structures and shapes may be used to support the position pointing device 2.

In the puck-type position-pointing device 1, a magnetic shielding member 13, under and/or covering the pen-type-device stand 12, shields the pen-type position-pointing device 2 from magnetic force generated by sensor coils in a position-detecting unit (not shown) when the pen-type position-pointing device 2 is inserted into the stand 12. A puck-type-device resonant coil 14 is positioned so that sufficient magnetic interaction occurs when the resonant coil 14 is in an upright position on the position-detecting surface of the position-detecting unit. The puck-type position-pointing device includes a puck-type-device resonant circuit substrate 15.

In the pen-type position-pointing device 2, a core member 16 is at the tip of the pen-type position-pointing device 2. A pen-type-device resonant coil 17 is positioned so that sufficient magnetic interaction occurs when the pen-type position-pointing device 2 is in an upright position on the position-detecting surface of the position-detecting unit. A writing-pressure detecting sensor 18 detects and inputs writing pressure from the core member 16. The pen-type position-pointing device 2 also includes a pen-type-device resonant-circuit substrate 19.

Figure 5:
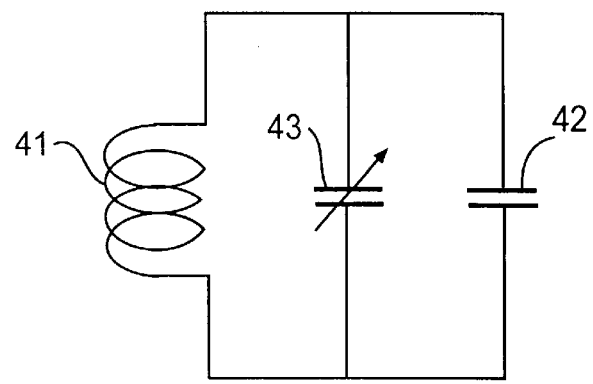
FIG. 5 is a circuit block diagram of a pen-type position-pointing device according to the first to fourth embodiments of the present invention.
Figure 6:
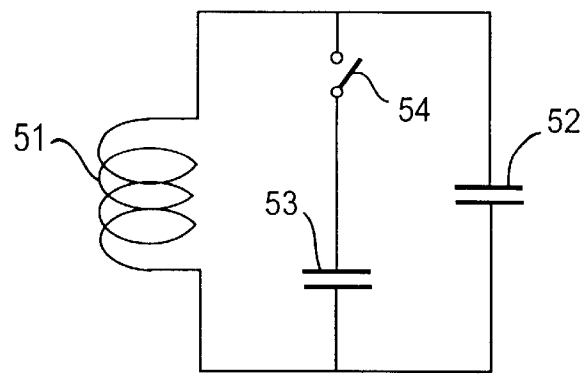
FIG. 6 is a circuit block diagram of a puck-type position-pointing device according to the first and second embodiments of the present invention.

FIG. 5 shows a circuit diagram of the pen-type position-pointing device 2 according to the first embodiment of the present invention, and FIG. 6 shows a circuit diagram of the puck-type position-pointing device 1.

The operation of the above-described puck-type position-pointing device 1 having the pen-type-device stand 12 will now be described.

The puck-type position-pointing device 1 and the pen-type position-pointing device 2 are shown in FIGS. 1A to 1C. Their internal structures are shown in FIGS. 2A and 2B. After positioning the position pointing devices on or close to the position-detecting surface of the position-detecting unit, the electromagnetic interaction between them and the position-detecting unit enables coordinate detection on the position-detecting surface. When the pen-type position-pointing device 2 is positioned in a range where its position can be detected by the position-detecting unit, the application of writing pressure to the core member 16 changes the capacitance of the writing-pressure detecting sensor 18 as a variable capacitor, and the position-detecting unit detects the corresponding change in the resonant frequency of the resonant circuit of the pen-type position-pointing device 2 as writing-pressure information. With the puck-type position-pointing device 1, the position-detecting unit detects on-and-off information from the switch 11, based on a change in the resonant frequency of the resonant circuit generated when the switch 11 is turned on.

The circuit of the pen-type position-pointing device 2, shown in FIG. 5, includes a coil 41, a capacitor 42, and a variable capacitor 43 functioning as a writing-pressure detecting sensor. The capacitance of the variable capacitor 43 changes according to writing pressure, and the resonant frequency generated by a magnetic field from the coil 41 changes accordingly.

The circuit of the puck-type position-pointing device 1, shown in FIG. 6, includes a coil 51, capacitors 52 and 53, and a micro switch 54. Pressing the switch 11, shown in FIGS. 1B and 1C or FIG. 2B, turns on the micro switch 54, and the capacitance of the capacitor 53 is added to the resonant circuit including the coil 51 and the capacitor 52. This changes the resonant frequency generated by a magnetic field from the coil 61, and the position-pointing device detects this change as switch information.

According to the above-described operating principle, after loading the pen-type position-pointing device 2 into the pen-type-device stand 12, the magnetic shielding member 13, built into the pen-type-device stand 12, breaks the electromagnetic interaction between the pen-type position-pointing device 2 and the position-detecting unit. Then, the position-detecting unit cannot recognize pen-type position-pointing device 2. This deactivates the position-pointing function of the pen-type position-pointing device 2.

Any type of position-detecting unit using electromagnet interaction for detecting the position of a position-pointing device can be used as the position-detecting unit according to the first embodiment of the present invention. Any type of position-pointing device that does not always obtain switch information and writing-pressure information can be used as the position-pointing device according to the first embodiment of the present invention. In addition, any type of position-detecting unit that does not always detect switch information and writing-pressure information output from a position-pointing device can be used as the position-detecting unit according to the first embodiment of the present invention.

Figure 3:
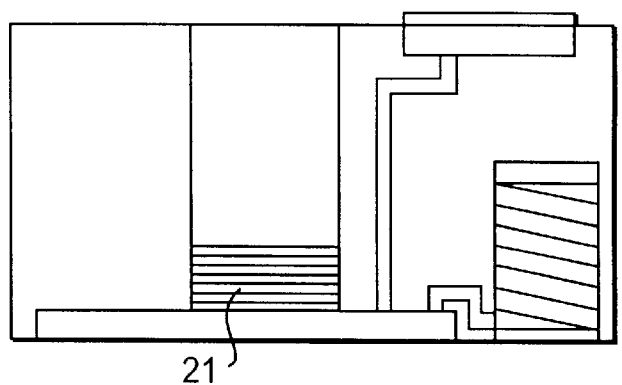
FIG. 3 is an internal side view showing a puck-type position-pointing device according to a second embodiment of the present invention.

A second embodiment of the present invention will be described below with reference to the attached drawings. FIG. 3 shows the internal structure of a puck-type position-pointing device 1 according to the second embodiment of the present invention. As shown in FIG. 3, a short-circuiting coil 21, on the bottom surface of a pen-type-device stand 12, shields a pen-type position-pointing device 2 from the magnetic force generated by sensor coils in a position-detecting unit when the pen-type position-pointing device 2 is loaded into the pen-type-device stand 12. The circuit diagram of the puck-type position-pointing device 1 and the structure and circuit diagram of the pen-type position-pointing device 2 are similar to those in the first embodiment.

After loading the pen-type position-pointing device 2 into the pen-type-device stand 12, the short-circuiting coil 21 hinders the electromagnetic interaction between the pen-type position-pointing device 2 and the position-detecting unit. Then, the position-detecting unit cannot recognize the pen-type position-pointing device 2. This deactivates the position-pointing function of the pen-type position-pointing device 2.

Any type of position-detecting unit using electromagnetic interaction for detecting the position of a position-pointing device can be used as the position-detecting unit according to the second embodiment of the present invention. Any type of position-pointing device that does not always obtain switch information and writing-pressure information can be used as the position-pointing device according to the second embodiment of the present invention. In addition, any type of position-detecting unit that does not always detect switch information and writing-pressure information output from a position-pointing device can be used as the position-detecting unit according to the second embodiment of the present invention.

Figure 4A:
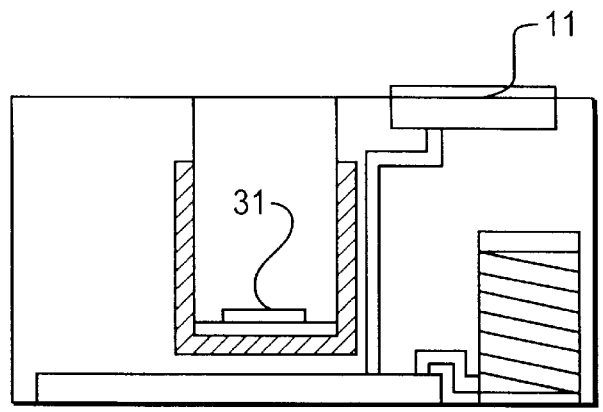
FIGS. 4A and 4B are internal side views showing puck-type position-pointing devices according to a third and a fourth embodiment of the present invention.
Figure 4B:
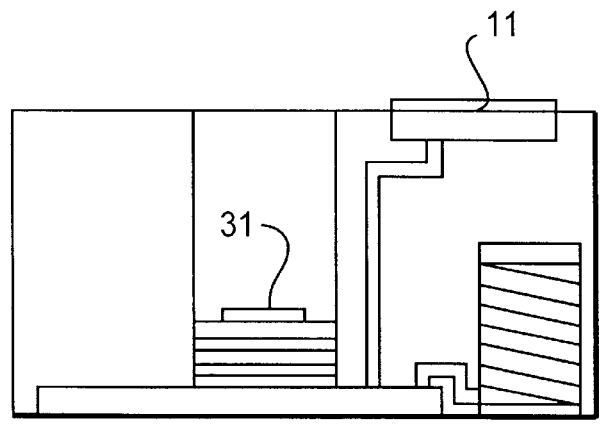

A third embodiment of the present invention will now be described. FIGS. 4A and 4B show the internal structure of a puck-type position-pointing device 1 (described below) according to the third embodiment of the present invention. As shown in FIGS. 4A and 4B, switches 31 turn on when a pen-type position-pointing device 2 is loaded into a pen-type-device stand 12.

Figure 7:
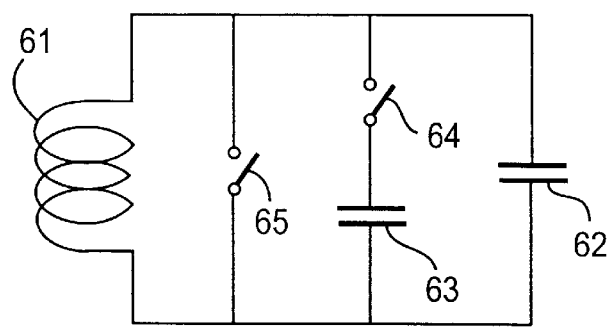
FIG. 7 is a circuit diagram of puck-type position-pointing device according to the third embodiment of the present invention.

A circuit diagram of the puck-type position-pointing device 1 according to the third embodiment of the present invention is shown in FIG. 7. The structure and circuit diagram of the pen-type position-pointing device are similar to those in the first embodiment. The circuit shown in FIG. 7 includes a coil 61, capacitors 62 and 63, a micro switch 64, and a short-circuit switch 65.

Pressing the switch 31, shown in FIG. 4A or 4B, opens the short circuit switch 65. When the pen-type position-pointing device 2 is loaded into the pen-type-device stand 12, the switch 31 opens the short circuit switch 65. Accordingly, the circuit of the puck-type position-pointing device 1 according to the third embodiment becomes equivalent to that shown in FIG. 6 and operates similarly to the first or second embodiment.

When the pen-type position-pointing device 2 is removed from the pen-type-device stand 12, the switch 31 closes the short circuit switch 65, and the coil 61 is short-circuited. Accordingly, even when positioning the puck-type position-pointing device on or close to the position-detecting surface of the position-detecting unit, no electromagnetic interaction occurs. The position-detecting unit will not recognize the puck-type position-pointing device. This deactivates the position-pointing function of the puck-type position-pointing device.

According to the third embodiment of the present invention, the short circuit switch 65 opens when the pen-type position-pointing device is loaded and closes when it is removed. Any arrangement of the switch 31 and the short-circuit switch 65 may be used if it operates in the above manner.

In addition, when the pen-type position-pointing device 2 is not loaded into the pen-type-device stand 12, the puck-type position-pointing device is deactivated. However, by disposing a second short-circuit switch in series with the switch 65 (shown in FIG. 7), and by providing a switch in addition to the pen-type-device stand 12 in a portion of the puck-type position-pointing device 1 (shown in FIG. 1B or 1C) where the switch can be pressed while operating the puck-type position-pointing device I so that the short-circuit switch 65 can be opened by pressing the provided switch, it is not always required that the puck-type position-pointing device 1 is deactivated when the pen-type position-pointing device 2 is not loaded into the pen-type device 12. In other words, the puck-type position-pointing device 1 may be formed so that, by operating the puck-type position-pointing device 1 while the switch is being turned on without loading the pen-type position-pointing device 2 into the pen-type device stand 12, the short-circuit switch 65 is opened, and the circuit of the additional switch included in the puck-type position-pointing device 1 is equivalent to that shown in FIG. 6, and operates similarly to the first or second embodiment.

Figure 8:
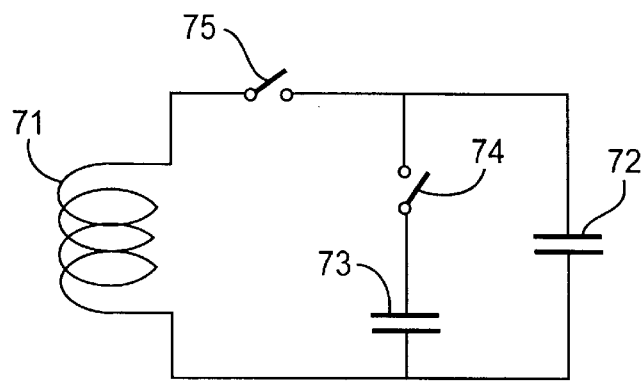
FIG. 8 is a circuit diagram of a puck-type position-pointing device according to the fourth embodiment of the present invention.

A fourth embodiment of the present invention will now be described. FIGS. 4A and 4B show the internal structure of the puck-type position-pointing device 1 according to the above-described third embodiment or a fourth embodiment of the present invention. The circuit diagram of the puck-type position-pointing device 1 according to the fourth embodiment is shown in FIG. 8. In addition, the structure and circuit diagram of a pen-type position-pointing device 2 are similar to those in the first embodiment.

The circuit shown in FIG. 8 includes a coil 71, capacitors 72 and 73, a micro switch 74 and an open circuit switch 75. Pressing the switch 31 shown in FIG. 4A or 4B, closes the open circuit switch 75.

When the pen-type position-pointing device 2 is loaded into the pen-type-device stand 12, the switch 31, shown in FIG. 4A or 4B, closes the open circuit switch 75, and the circuit of the puck-type position-pointing device 1 is equivalent to that shown in FIG. 6, and is operated similarly to the first or second embodiment.

When the pen-type position-pointing device 2 is removed from the pen-type-device stand 12, the switch 31 opens the open circuit switch 75. Accordingly, even when the puck-type position-pointing device 1 is positioned on or close to the position-detecting surface of the position-detecting unit, no electromagnetic interaction occurs, and the position-detecting unit cannot recognize the puck-type position-pointing device 1. This can deactivate the position-pointing function of the puck-type position-pointing device 1.

According to the fourth embodiment of the present invention, the switch 31 short-circuits when the pen-type position-pointing device is loaded and opens when it is taken off. Any arrangement of the switch 31 and the open circuit switch 75 may be used if it operates in the above manner.

In addition, when the pen-type position-pointing device 2 is not loaded into the pen-type device 12, the puck-type position-pointing device 1 is deactivated. However, by disposing an open switch in parallel to the switch 75, and providing a switch in addition to the pen-type device stand 12 in a portion of the puck-type position-pointing device 1 (shown in FIG. 1) where the switch can be pressed while operating the puck-type position-pointing device 1 so that the open switch 75 can be short-circuited by pressing the switch, it is not always required that the puck-type position-pointing device is deactivated when the pen-type position-pointing device 2 is not loaded into the pen-type device stand 12. In other words, the puck-type position-pointing device I may be formed so that, by operating the puck-type position-pointing device 1 while the switch is being turned on without loading the pen-type position-pointing device 2 into the pen-type device stand 12, the open switch 75 can be opened, and the circuit of the additional switch included in the puck-type position-pointing device 1 is equivalent to that shown in FIG. 6, and operates similarly to the first or second embodiment.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A position pointing device for use with a position-detecting unit, comprising:
    a housing having a support for supporting a second position pointing device for use with the position-detecting unit;
    means, in the housing, for transmitting information to the position-detecting unit; and
    means for hindering the transmission of information from the second position pointing device to the position-detecting unit.

2. The position pointing device as claimed in claim 1, wherein the means for transmitting information comprises an inductive circuit.

3. The position pointing device as claimed in claim 1, wherein the housing has a puck-like shape and the second position pointing device has a pen-like shape.

4. The position pointing device as claimed in claim 3, wherein the support comprises an aperture for receiving the second position pointing device.

5. The position pointing device as claimed in claim 1, further comprising a switch actuated by the second position pointing device, wherein the switch enables the means for transmitting when the support supports the second position pointing device, and wherein the switch disables the means for transmitting when the support does not support the second position pointing device.

6. A position pointing device for use with a position-detecting unit, comprising:
    a housing having a support for supporting a second position pointing device for use with the position-detecting unit;
    means, in the housing, for transmitting information to the position-detecting unit; and
    means for hindering the transmission of information from the second position pointing device to the position-detecting unit, wherein the means for hindering comprises a magnetic shield.

7. A position pointing device for use with a position-detecting unit, comprising:
    a housing having a support for supporting a second position pointing device for use with the position-detecting unit;
    means, in the housing, for transmitting information to the position-detecting unit; and
    means for hindering the transmission of information from the second position pointing device to the position-detecting unit, wherein the means for hindering comprises a conductive coil.

8. A data input device, comprising:
    a graphics tablet having conductive sensor coils;
    a first position pointing device having a conductive coil for inductive coupling to the sensor coils; and
    a second position pointing device having a conductive coil for inductive coupling to the sensor coils, the second position pointing device having a support for the first position pointing device and means for hindering inductive coupling between the first position pointing device and the sensor coils, wherein the means for hindering comprises a magnetic shield.

9. A data input device, comprising:

a graphics tablet having conductive sensor coils;

a first position pointing device having a conductive coil for inductive coupling to the sensor coils; and a second position pointing device having a conductive coil for inductive coupling to the sensor coils, the second position pointing device having a support for the first position pointing device and means for hindering inductive coupling between the first position pointing device and the sensor coils, wherein the means for hindering comprises a conductive coil.

10. A coordinate input device, comprising:

a tablet;

a pen-shaped indicator for electromagnetically providing an input through the tablet; and a puck-shaped indicator for electromagnetically providing an input through the tablet, the puck-shaped indicator including a support member for supporting the pen-shaped indicator, and an electromagnetic interception means for intercepting the electromagnetic interaction between the pen-shaped indicator and the tablet when the pen-shaped indicator is supported by the support member.

11. The coordinate input device of claim 10, wherein the electromagnetic interception means includes magnetic shield material.

12. The coordinate input device of claim 10, wherein the electromagnetic interception means includes a short-circuiting coil.

13. The coordinate input device of claim 10, further comprising a switch means, wherein the switch means disables the puck-shaped indicator from electromagnetically providing an input through the tablet when the pen-shaped indicator is not supported by the support member, and wherein the switch means enables the puck-shaped indicator to electromagnetically provide an input through the tablet when the pen-shaped indicator is supported by the support member.

14. The coordinate input device of claim 13, wherein the electromagnetic interception means includes magnetic shield material.

15. The coordinate input device of claim 13, wherein the electromagnetic interception means includes a short-circuiting coil.

* * * * *